United States Patent [19]
Simmons et al.

[11] Patent Number: 5,778,327
[45] Date of Patent: Jul. 7, 1998

[54] GUIDEWIRE CONTROLS FOR A MATERIAL HANDLING VEHICLE

[75] Inventors: James M. Simmons, Newark Valley; Christopher J. Hellmann, Apalachin; Richard M. Day, Binghamton, all of N.Y.

[73] Assignee: The Raymond Corporation, Greene, N.Y.

[21] Appl. No.: 747,244

[22] Filed: Nov. 12, 1996

Related U.S. Application Data

[63] Continuation of Ser. No. 150,708, Nov. 10, 1993, abandoned.
[51] Int. Cl.$^6$ .................................................. G06F 165/00
[52] U.S. Cl. ........................... 701/23; 318/587; 180/169
[58] Field of Search ........................ 364/424.27, 424.28, 364/424.32; 318/580, 581, 587; 180/167, 168, 169; 701/23, 24, 27

[56] References Cited

U.S. PATENT DOCUMENTS

| | | | |
|---|---|---|---|
| 4,307,329 | 12/1981 | Taylor | 318/587 |
| 4,791,570 | 12/1988 | Sherman et al. | 364/424.028 |
| 4,902,948 | 2/1990 | Sherman et al. | 318/587 |
| 5,281,901 | 1/1994 | Yardley et al. | 364/424.028 |
| 5,341,130 | 8/1994 | Yardley et al. | 364/424.028 |
| 5,519,296 | 5/1996 | Day | 318/587 |

*Primary Examiner*—Gary Chin
*Attorney, Agent, or Firm*—Quarles & Brady

[57] ABSTRACT

The present invention features a universal, manned, material handling vehicle. The material handling vehicle is capable of operating in a manned mode, a wire guidance mode, and a rail guidance mode. This manned material handling vehicle contains a steering management control system having a logic program which allows the vehicle to adapt itself to different wire control systems. That is, particular parameters, frequency and amplitude of the underlying wire guidance system can be determined. In this manner, the manned vehicle is universally adaptive to a wide variety of wire guidance systems. When in manned operation mode, should the vehicle receive a wire guidance signal, the system controller will be duly informed. When in wire guidance operation mode, should the vehicle lose or fail to receive a clear wire guidance signal appropriate to guide on, it will automatically revert to the manned operation mode. The steering management control system also monitors the weight and height of the vehicle's load. This steering management control system receives signals from the steering tiller, as well as from the guidewire embedded in the floor of the material storage facility.

10 Claims, 7 Drawing Sheets

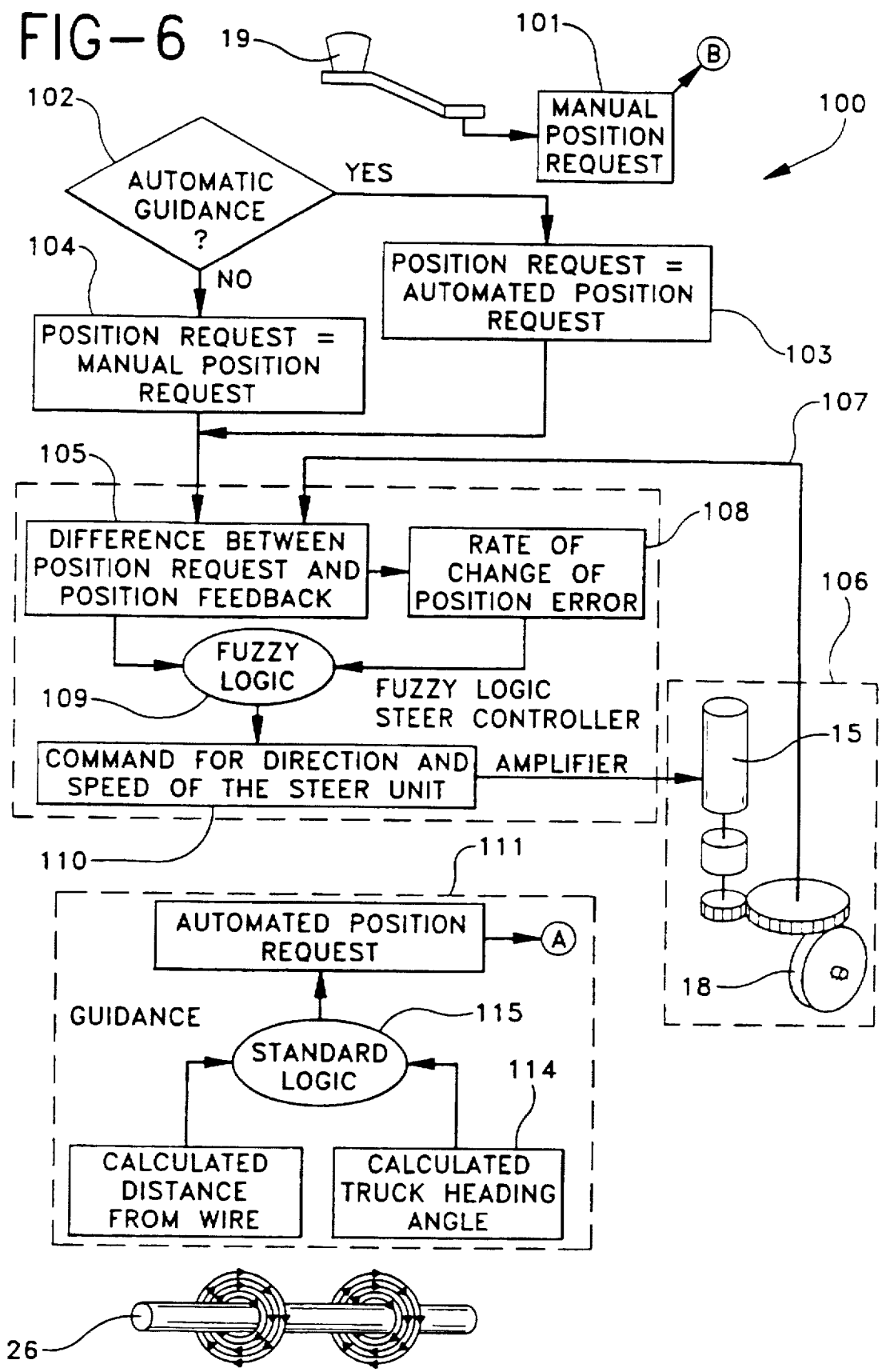

GUIDEWIRE CONTROLS FOR A MATERIAL HANDLING VEHICLE

This is a continuation of application Ser. No. 08/150,708 filed Nov. 10,1993, now abandoned.

FIELD OF THE INVENTION

The present invention pertains to guidewire controls for manned material handling vehicles and, more particularly, to a universal guidewire fuzzy control system for manned material handling vehicles that is capable of adapting to and learning the different frequencies and amplitudes of diverse guidewire systems.

BACKGROUND OF THE INVENTION

Unmanned vehicles have heretofore been guided through a warehouse or other storage facility by guidewire control systems. Fuzzy logic can also be used to control the speed and direction of unmanned vehicles, as is illustrated in U.S. Pat. No. 5,218,542 (issued to Endo et al on Jun. 8, 1993).

Many manned material handling vehicles (such as forklifts, reach-trucks and order-pickers) can be alternatively controlled by a wire guidance system. Such additional control is a valuable operative feature.

The use of pairs of coils disposed on the vehicle centerline, in order to generate an error signal indicative of vehicle deviation from the embedded or buried wire, is also well known, as illustrated in U.S. Pat. No. 4,307,329 (issued to Taylor on Dec. 22, 1981).'

Designing a manned vehicle for wire guidance operations continues to pose several problems. Each warehouse facility that has installed guidewire controls for guided vehicles operates the controls at different wire frequencies and amplitudes that are designed for its own distinct wireguided system. Any mass-produced (non-customized) material handling vehicle must, therefore, have the capability of recognizing and responding to the different frequencies and amplitudes of warehouse wire guidance systems. Manned material handling vehicles must have the capability of automatically switching to manual control when the wire guidance control is interrupted or becomes disabled.

It would be advantageous to provide a logic control structure for adapting to the different frequencies and amplitudes of the various wire guidance systems.

It would also be advantageous for such logic to allow for automatic switching from wire guidance to manual control when guidance signals are inadequate to properly guide the vehicle.

The logic of the present invention operates in a learning mode, wherein the logic learns the parameters of the guidance system, and is thereafter capable of sufficiently operating under wire guidance control. The operator of the manned vehicle situates the vehicle over the guidance wire so that antennae within the vehicle can sense the signal from the guidewire. The antennae system is automatically normalized to adapt the vehicle to any signal level or frequency.

The vehicle is steered by means of a DC steer motor that forms part of the steer wheel control system. Fuzzy logic is used to control the position of the motor. The heading angle drive unit position is automatically and continuously updated as a function of actual vehicle position measurements, so that the vehicle does not overshoot. Should the wire signal be lost, the material handling vehicle will automatically revert to the manual steering mode, and the brake will be applied.

SUMMARY OF THE INVENTION

In accordance with the present invention, there is provided a universal, manned, material handling vehicle that is capable of operating in a manual mode, a wire guidance mode, and a rail guidance mode. This, manned material handling vehicle contains a steering management control system comprising a logic program which allows the vehicle to adapt itself to different wire control systems. That is, the particular parameters, frequency and amplitude of the underlying wire guidance system can be determined. In this manner, the manned vehicle is universally adaptive to a wide variety of wire guidance systems. When in manual operation mode, should the vehicle receive a wire guidance signal appropriate to guide on, a signal will be sent to the system controller. When in wire guidance operation mode, should the vehicle lose or fail to receive a clear wire guidance signal, it will automatically revert to the manual operation mode. This steering management control system receives signals from the steering tiller, as well as from the guidewire embedded in the floor of the material storage facility. It also is capable of automatically aligning the vehicle with the guidewire.

BRIEF DESCRIPTION OF THE DRAWINGS

A complete understanding of the present invention may be obtained by reference to the accompanying drawings, when considered in conjunction with the subsequent detailed description, in which:

FIG. 6 is a flow chart and schematic diagram of the steering mechanism, in accordance with the steering management control system illustrated in FIG. 2.

DESCRIPTION OF THE PREFERRED EMBODIMENT

Generally speaking, the invention pertains to an electronic steering system for operating material handling vehicles in either a manual or an otherwise guided mode. This steering system comprises a logic program that adapts to, and learns, the frequencies and amplitudes of any particular guidewire. Failure to sense the guidewire signal will cause the steering control to switch to manual operation. This steering system employs fuzzy logic for controlling the steering unit.

Figure 1:
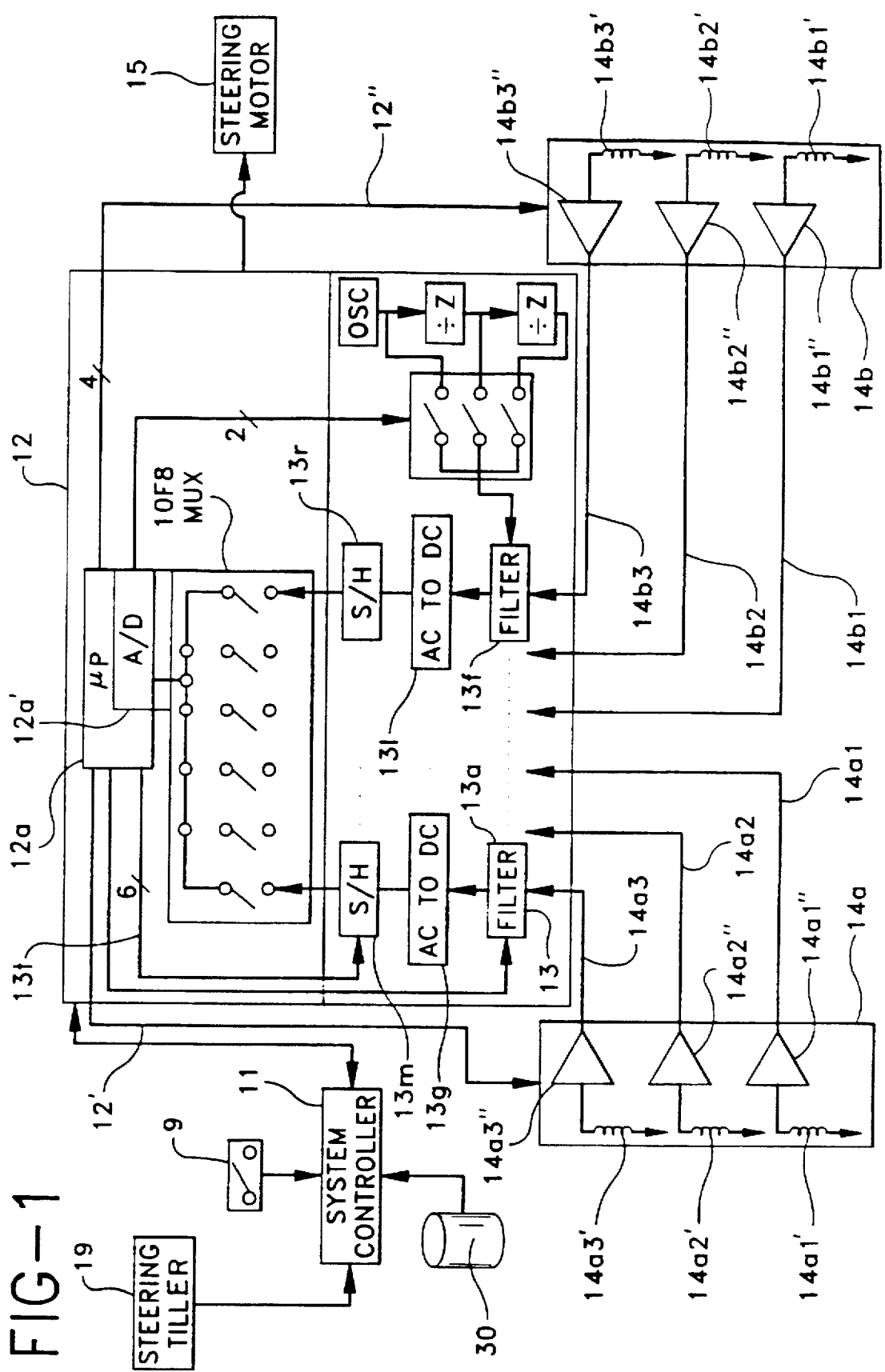
FIG. 1 is a schematic diagram of the control system of the invention.
Figure 2:
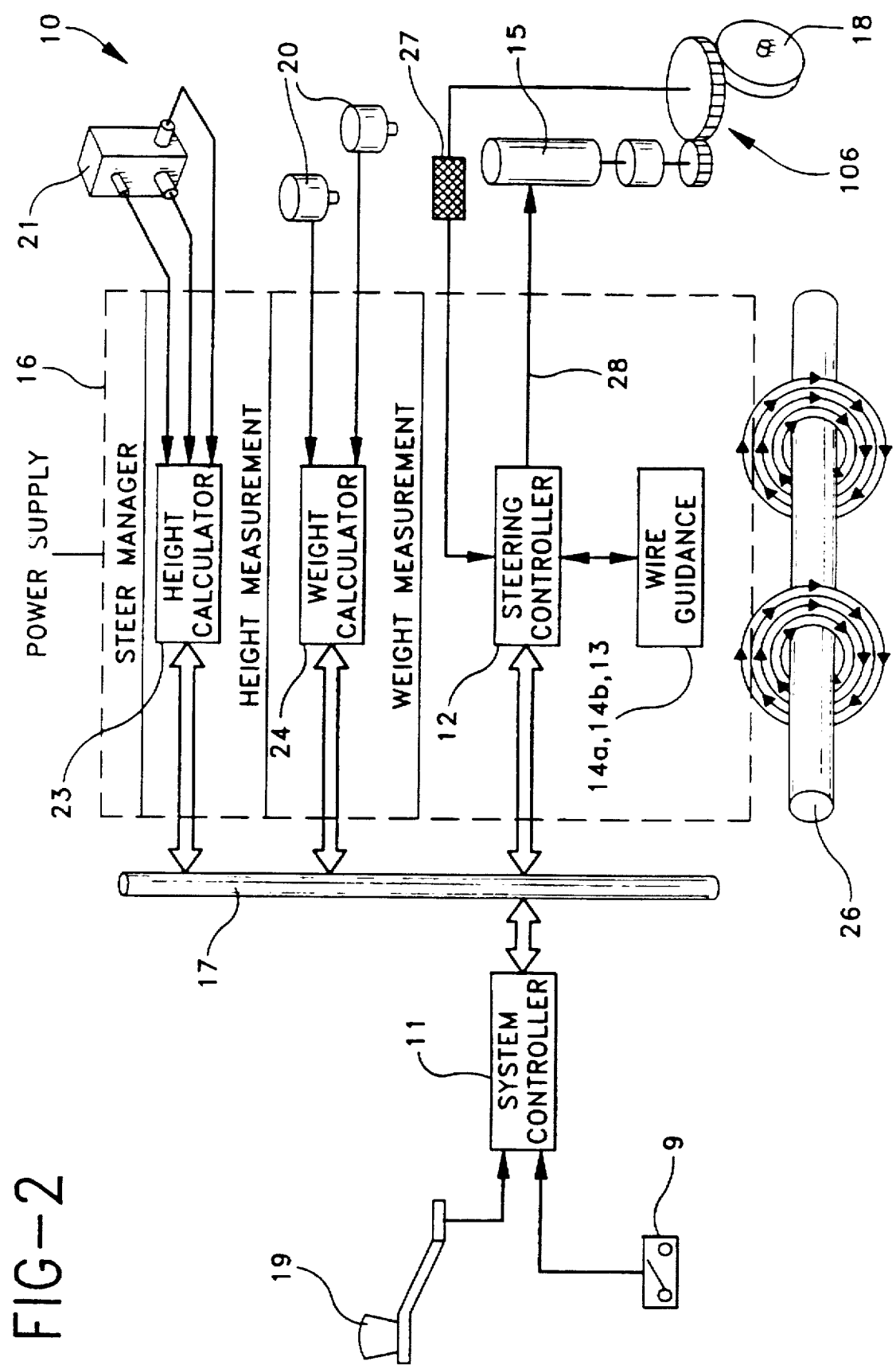
FIG. 2 is a schematic diagram of the steering management control system of the inventive system shown in FIG. 1.

Now referring to FIGS. 1 and 2, schematic diagrams of the control system 10 of this invention are illustrated. The control system 10 comprises a system controller 11 that communicates with a steering controller 12 via a communications bus 17. The system controller 11 is responsive to the manual direction signal provided by a steering tiller 19, an AUTO/MANUAL switch 9, and vehicle speed, as represented by a traction encoder 30. A steer manager 16 (FIG. 2) is programmed with fuzzy logic; the steer manager 16 controls the operational modes (i.e., either a manual or a wire guidance mode) of the steering controller 12. Steering controller 12 has two basic tasks, to wit, managing the overall operation of the steering system and positioning the drive unit (steer motor 15 and steer wheel or drive unit 18), based on commands from either the operator's steering tiller 19 or the information provided by wire guidance (antennae 14a and 14b, respectively).

The logic program of the steer manager 16 also provides for the configuration of several system variables which allow the operation of the vehicle to be customized for or by the user, not shown.

A positioning routine in the fuzzy logic program utilizes a signal denoting where the drive unit 18 is to be positioned; it then determines where the drive unit 18 is actually positioned and generates the necessary commands to move it to the desired position. The fuzzy logic program is developed using the fuzzy logic package Fide Version 1.03, from Aptronics Corp.

The steering controller 12 receives signals from the pair of wire guidance antennae 14a and 14b, respectively, and uses these signals to control the steering motor 15, and hence the attitude of the vehicle which may be of a type designed for order picking (not shown) via the steer wheel 18.

Figure 3:
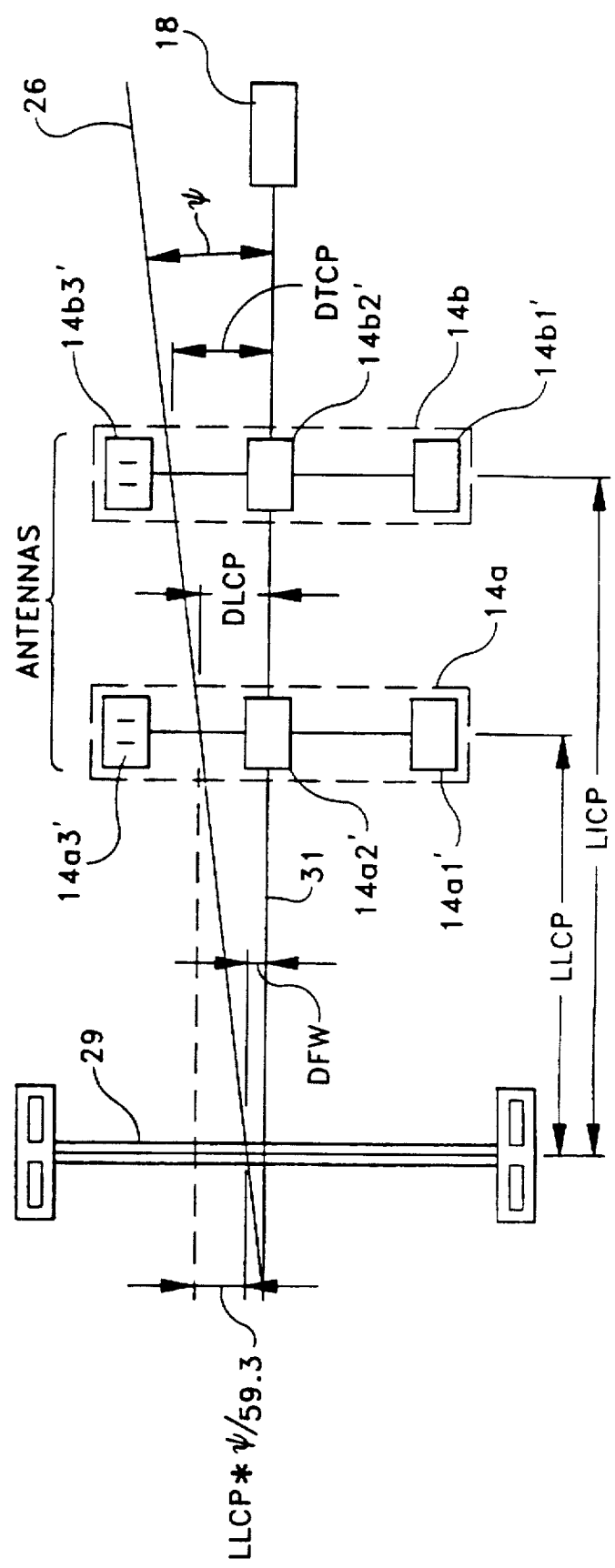
FIG. 3 is a schematic diagram of the antenna's layout for guiding a material handling vehicle.

Referring now also to FIG. 3, the antennae 14a and 14b monitor the frequency and amplitude signals in a guidewire 26. The antennae 14a and 14b are shown disposed on the vehicle centerline 31. In order to guide the vehicle, the fuzzy logic program performs the calculations shown at the bottom of FIG. 3 and described hereinbelow.

The antenna, comprising components 14a and 14b, is the basic unit of the wire guidance system. Its function is to determine the lateral position of the guidewire 26 relative to the centerline 31 of the vehicle, not shown, at the antenna location. Each antenna 14a and 14b operates independently of any other antenna in determining the lateral position of the guidewire 26. The outputs of different antennas can then be combined to provide additional position information, such as heading angle, as described in the aforementioned U.S. Pat. No. 4,307,329 (hereinafter Taylor).

Referring again to FIG. 1, each antenna 14a and 14b comprises three independent channels: a nearwire channel 14a2, 14b2, respectively, and two guidance channels 14a1, 14a3 and 14b1, 14b3, respectively. In the interest of simplifying the present description, only antenna 14a and components associated therewith will be described in detail, since antenna 14b operates identically. The nearwire channel 14a2 is used to measure the amplitude of the signal from the guidewire 26. This information is used in two ways: to determine if the guidewire signals are of sufficient strength for proper operation, as discussed in the Taylor patent; and, additionally, to adjust the output of the guidance channels 14a1, 14a3 to correct for varying signal levels. This second application is commonly referred to as automatic gain control (AGC).

The guidance channels 14a1, 14a3 are used together to determine the lateral position of the guidewire 26 as described in the Taylor patent. Typically the output of one channel (say, 14a1) is subtracted from the output of the other channel (14a3) and then the difference is scaled to represent lateral guidewire position. In the present device, this differencing is performed by a microprocessor unit 12a in the steering controller 12. Microprocessor 12a includes a multiplexed input A/D converter 12a' for receiving signals from each antenna channel.

Differencing has a disadvantage in that its value is proportional to the amplitude of the signal received from the guidewire 26. Thus, if the amplitude of the wire signal decreases to zero, the difference will also decrease to zero. In the present device, automatic gain control is applied in order to prevent the amplitude of the difference signal from depending on signal strength from the guidewire 26.

Operation of the automatic gain control consists of an AGC algorithm that measures the amplitude of the received signal in the nearwire channel 14a2 independently in each antenna, and then compares the measured values against a set reference value in the form of ratios:

Relative Signal Ratio=Reference Value÷Measured Value

This ratio is calculated independently for each antenna, 14a and 14b. Additionally, the magnitude of this ratio is constrained to a value of between 0.7 and 5 in order to prevent the magnification of noise signals. The differenced output of the guidance coils at each antenna (say 14a) are then multiplied by the Relative Signal Ratio for that antenna 14a in order to make the differences independent of the amplitude of received signal. These ratios and multiplications are performed by microprocessor 12a in the steering controller 12.

Each of the antenna channels has the same basic structure. The signal from the guidewire 26 is received by each channel (say 14a1) using an antenna coil 14a1' and the received signal is amplified by an amplifier 14a1" for transmission to the steering controller 12. The amplifiers 14a1", 14a2", 14a3" are provided with sixteen individual gain selections set in linearly spaced steps in order to advantageously provide for adapting to a large range of signals from the guidewire 26. This scheme is used in conjunction with the aforementioned AGC algorithm to extend the operating range of the antennae 14a, 14b.

Selection of a particular gain value is controlled by the microprocessor 12a in the steering controller 12 using four digital control lines 12' and 12", respectively for each antenna 14a and 14b. The gain of each antenna 14a, 14b can be set independently in order to allow compensation for reduced or increased signal conditions caused by locating the antenna at different heights and/or in proximity to objects in the vehicle frame which cause distortion of the magnetic field about the guidewire 26. These gain selections are changed as part of the process of learning the characteristics of the guidewire 26, described in greater detail hereinbelow. The value of gain selected is chosen in order to operate the signal channel in an optimum manner, so it will have the maximum amplitude signals possible without saturating or clipping.

The antenna coils 14a1', 14a2', 14a3' are located and oriented in a vertical plane in order to provide maximum immunity to noise signals generated by sources other than the guidewire 26. The guidance coils 14a1', 14a2', 14a3' are located so as to straddle the guidewire 26, as shown in FIG. 3. The outputs of these coils 14a1', 14a2', 14a3' are arranged so as to be in phase, even though they are independent channels, in order to provide maximum noise immunity. Since the guidewire 26 position is determined by subtracting two channels (14a1 from 14a3, for example), any common-mode noise received is cancelled out.

In the Taylor patent, the nearwire antenna coil consists of a single coil located at the center of the antenna. In the present device, however, this nearwire antenna coil 14a2' actually consists of two separate antenna coils (shown as one in the FIGURE) which are wired together in series. One of the two antenna coils 14a2' is located on each side of the guidewire 26 when the antenna 14a is centered thereover, in order to extract additional benefits from the application of the automatic gain control.

Automatic gain control cannot be applied to the nearwire channel in the Taylor patent because the output of the nearwire channel would then cause severe distortion in the displacement calculation. The two coils comprising the nearwire antenna 14a2 are used together to provide a relatively constant output over a range of antenna displacement in order to prevent the described distortion. The automatic gain control then properly responds only to signal level variations.

Figure 4:
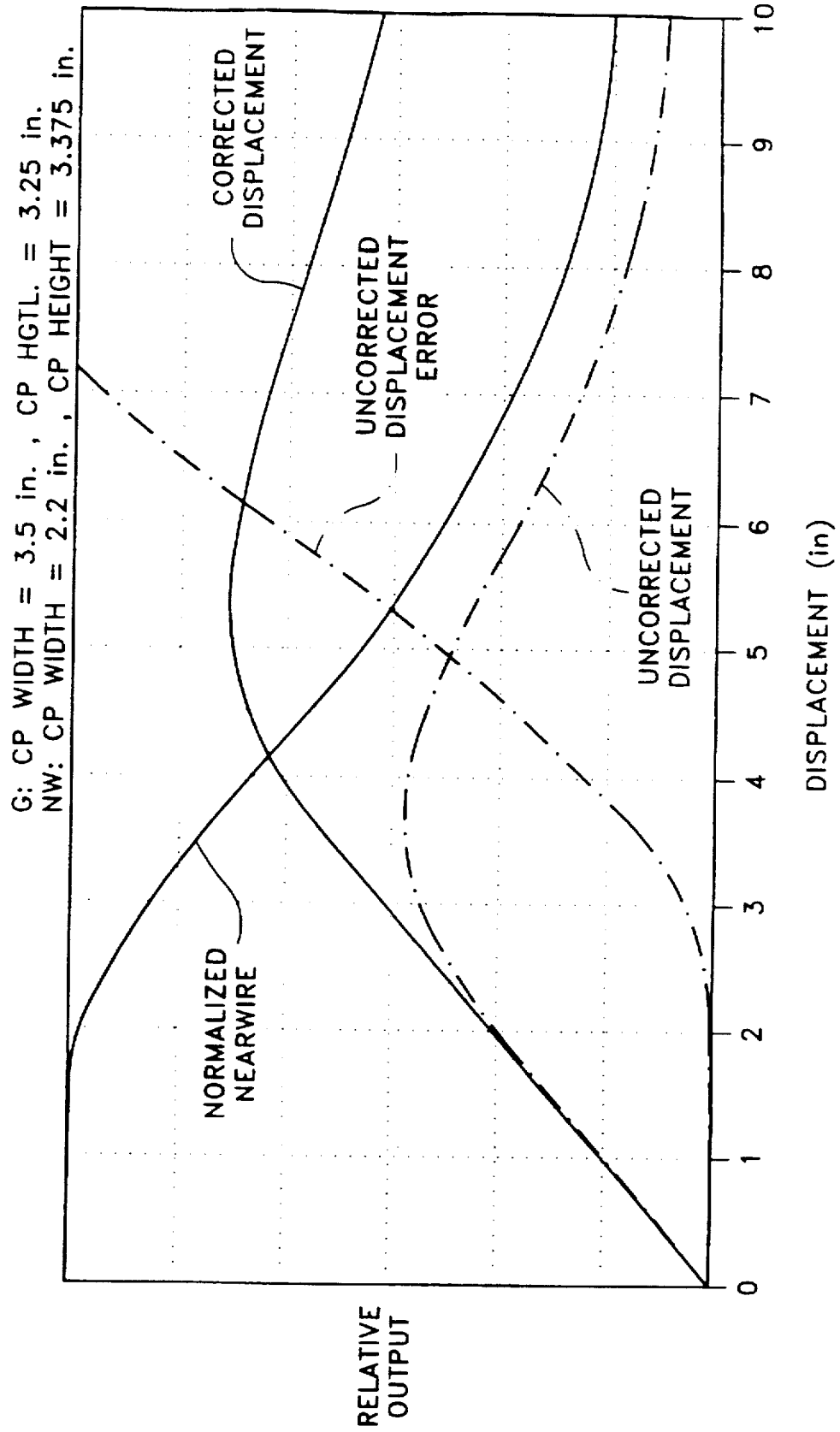
FIG. 4 is a graph depicting measured displacement and corrected displacement signals for each antenna.

The operation of the AGC Algorithm is additionally enhanced in the present invention by carefully arranging the actual geometry between the guidance 14a1, 14a3 and nearwire 14a2 antennae. The differenced output of the guidance antenna coils 14a1', 14a3', is generally quite linear between the coils, but peaks when either coil is directly over the guidewire 26 and then quickly falls off to zero. This relationship is shown in FIG. 4, labeled "Uncorrected Displacement" and limits the useful range of the antenna to its physical width. In a similar fashion, the output of the nearwire antenna 14a2 is at a maximum when the antenna 14a is centered over the guidewire 26. It then falls off to zero as the displacement is increased. This relationship is shown in FIG. 4, labeled "Normalized Nearwire".

The nearwire antenna 14a2 is designed to have a relatively constant output over the range where the differenced output of the guidance channels is linear (approximately between 0 and 2 inches on FIG. 4). Nearwire antennae output then begins to fall off at a rate approximately proportional to the rate at which the differenced output decreases from a linear output. In other words, the normalized nearwire output is a mirror image of the Uncorrected Displacement Error shown in FIG. 4. This relationship causes the automatic gain control algorithm to advantageously extend the operating range of the differenced output of the guidance channels 14a1, 14a3. This relationship is shown as "Corrected Displacement" on FIG. 4. Since the antenna range is extended by this technique, a much smaller antenna with the same range as that described by the Taylor patent can be constructed. U.S. Pat. No. 3,993,156, issued to Rubel, describes an antenna coil arrangement and algorithm for providing extended operating range. The patented device employs two horizontally oriented coils for measuring displacement and two substantially vertical coils oriented in a plane approximately 20 degrees from vertical. This antenna is unable to reject common mode noise signals due to its horizontally-oriented guidance coils. Moreover, construction is relatively expensive, due to its required concentric coils at specific angles.

Referring again to FIG. 1, the signals from the antennae 14a and 14b are sent to a signal processing or filter card 13. This card 13 processes each antenna signal separately by filtering the signals using bandpass filters 13a, . . . , 13f and converting the signals to DC signals referenced to ground. These signals are then converted to digital signals using the analog to digital (A/D) converter 12a' in the microprocessor 12a.

Noise rejection of the antennae 14a, 14b is an important aspect of the invention, but additional measures are employed as well. The DC output of all channels 14a1, . . . , 14b3 is fed simultaneously to respective sample and hold devices 13m, . . . , 13r, which freeze all channel outputs at the same moment in order to maximize common-mode noise rejection.

Filtering of the signals is important to remove unwanted signals generated by external devices such as power lines, lighting, etc. The antennae 14a and 14b are broadband receivers, by design, in order to allow reception of a variety of guidewire signals. The invention employs filters 13a, . . . , 13f of the switched capacitor type which are digitally programmable. In the preferred embodiment, these filters 13a, . . . , 13f are manufactured by Maxim Corp. as part number MAX261. These filters 13a, . . . , 13f are programmed for a predetermined center frequency by application of a sampling clock, not shown, generated by an oscillator 13s and two divide-by-two (÷2) registers on the filter card 13 and by a 6-bit digital word 13t generated by the microprocessor 12a. The sampling clock can be changed to three different values by the steering controller microprocessor 12a in order to extend the operating range of the bandpass filters 13a, . . . , 13f. The 6-bit digital word 13t allows changing of the center frequency in 1% logarithmic steps. The combination of the 6-bit digital word 13t and selectable sampling clocks allow the microprocessor 12a to sweep the filter center frequency in order to find the frequency of the guidewire 26, as described in greater detail hereinbelow with reference to FIGS. 5a and 5b.

Another noise suppression method employed is a rate-limiting algorithm which limits the maximum rate of change of the differenced output of the two guidance channels 14a1, 14a3 to a set value. This technique limits the response to disturbance signals for smoother operation, while avoiding phase-lag problems inherent in a low-pass filter. The maximum allowed value is additionally changed to different values based on whether the vehicle is automatically acquiring the guidewire 26 or has already successfully locked thereonto. The maximum rate is greatly reduced when locked onto the guidewire 26 for smooth operation.

The present invention is capable of bidirectional travel on a straight guidewire 26. It is also capable of automatically acquiring guidewire 26 in two ways. The operator may drive the vehicle until it is oriented substantially over the guidewire 26 and then move the AUTO/MANUAL switch 9 to the automatic position, causing the system to assume steering and align the vehicle with the guidewire 26. Alternately, the operator may move the AUTO/MANUAL switch 9 to AUTOMATIC prior to being in proximity to the guidewire 26. The system will then assume steering only when one and/or both of the antennae 14a and 14b are in proximity to the guidewire 26 such that sufficient signal is received. The vehicle will then be automatically steered so as to align it with the guidewire 26.

The antennae 14a and 14b shown in FIGS. 1 and 3, previously described, are used together in some cases, and are used individually in other cases. Normal bidirectional operation on the guidewire 26 uses both antennae 14a and 14b together. Alternatively said antennae are used individually during acquisition of the guidewire 26 and/or in the event that one antenna 14a and/or 14b fails while both are being used together. The operation of the antennae 14a and 14b changes during acquisition of the guidewire 26 from individual operation to dual operation as soon as the minimum required signal is received in each antenna 14a and 14b.

Use of the antennae 14a and 14b together is similar to that described in Taylor, with the addition of several enhancements. A disadvantage of the Taylor arrangement is the inability to move the antennae away from the fixed axel of the vehicle while maintaining bidirectional operation. Moving the antennae away from the fixed axle is an advantage in that the antennae can be located on the vehicle more easily and can also be moved to a location which provides additional protection from damage.

An additional disadvantage of the Taylor design is the reliance on fixed antenna dimensions whereas flexible dimensions can better provide for the needs of a plurality of different vehicles.

Operation of the present invention provides for the use of both antennae 14a and 14b together, as described hereinafter.

The calculations for the heading angle ($\psi$) should remain the same as that in existing systems:

$$\psi=(DLCP-DTCP)*K\_\psi$$

where:

DLCP is the corrected displacement at the load measured coil pair

DTCP is the corrected displacement at the tractor measured coil pair $K\_\psi$ is a scaling factor to yield output in degrees. $K\_\psi$ is a function of the amplifier gains and the distance between coil pairs:

$$K\_\psi=(57.3* K\_DFW)/(LTCP-LLCP)$$

where:

LTCP is the length from load axle to tractor coil pair

LLCP is the length from load axle to load coil pair

K_DFW is a distance from wire scaling constant, determined by geometry and gain of amplifiers 14a1" through 14a3".

The dimensions LTCP and LLCP may be positive or negative as dictated by operational and physical needs of the vehicle.

The vehicle's distance from the wire should be calculated at the load axle 29, rather than at the sensor location. If it is not calculated at the load axle 29, then the DFW signal will favor one direction of travel over the other. Since it is more likely for designers to mount the sensor on the tractor end, the tractor's first travel will be aided and forks-first travel will be impeded, if DFW is not calculated at the load axle. This is very undesirable, since, due to vehicle geometry, it is more difficult to steer a vehicle in the forks-first direction.

To calculate the distance from wire (displacement) at the load axle 29, displacement at one coil pair and the vehicle heading angle must be known.

$$DFW=DLCP-LLCP*\psi/57.3$$

The distance from wire (DFW) and heading angle ($\psi$) signals are then combined (FIG. 6) as described in Taylor.

The steer manager 16 accepts the industry standard frequencies 5.2 KHz or 6.25 KHz as configurable guidance frequencies. This information is transmitted to the steer manager 16 via the network communications bus 17 during initialization of the system.

Figure 5A:
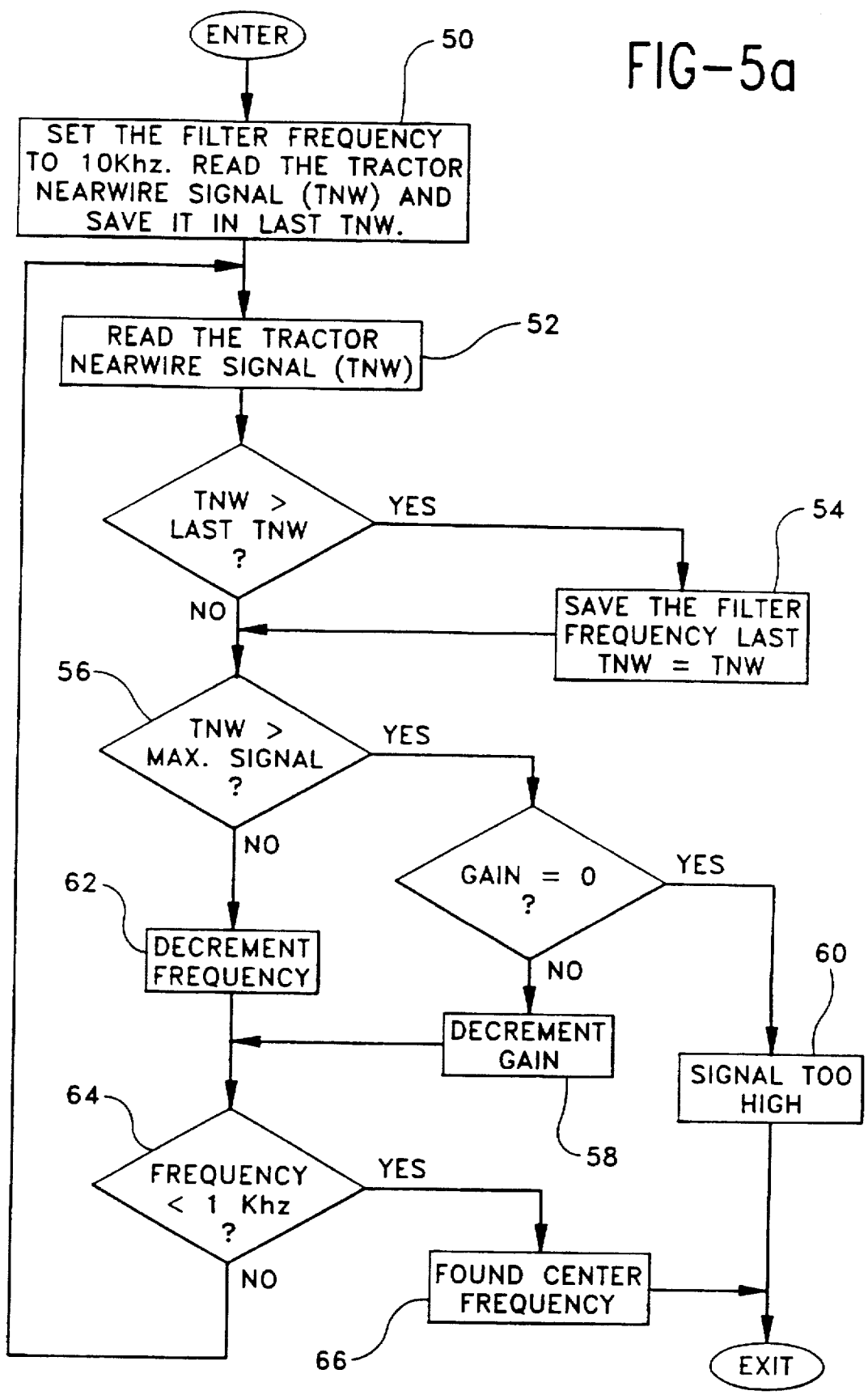
FIGS. 5a and 5b are flow charts of the process used, respectively, to determine frequency of the guide wire identified by the vehicle and to determine appropriate antenna gains.

FIG. 5a describes the process used for determining the guidewire frequency. First the programmable filters' center frequency and gain are set to their maximum values, step 50. The Tractor Near Wire (TNW) signal is continuously monitored, step 52. A trap for maximum signal of TNW and the current center frequency setting is performed, shown generally at step 54. If, during this process, the TNW signal becomes saturated, step 56, the gain is reduced, step 58. If the gain is at its minimum, then the guidewire signal is too strong for proper wire guidance, step 60, and the learning process is aborted. Otherwise, the center frequency is then decreased, step 62, to a minimum allowable frequency, step 64. After the full frequency range has been scanned, the center frequency has been found, step 66.

After determining the center frequency (FIG. 5a), the gain of the antennae 14a and 14b must be adjusted. This is accomplished using the process described in FIG. 5b. The filters are set to the aforementioned center frequency and the antennae gains are again set to their maximum limits, step 68. The Tractor Nearwire (TNW) and Load Nearwire (LNW) signals are continuously monitored, step 70. If the TNW signal is greater than its maximum usable voltage, step 72, the TNW gain is reduced, step 74. If the TNW signal is less than the maximum usable voltage, step 72, and also greater than its minimum usable voltage, step 76, then the tractor antennae gain has been found, step 78. However, if the TNW signal is less than the minimum usable voltage, step 76, then the guidewire signal is too weak for proper wire guidance, step 80.

Figure 5B:
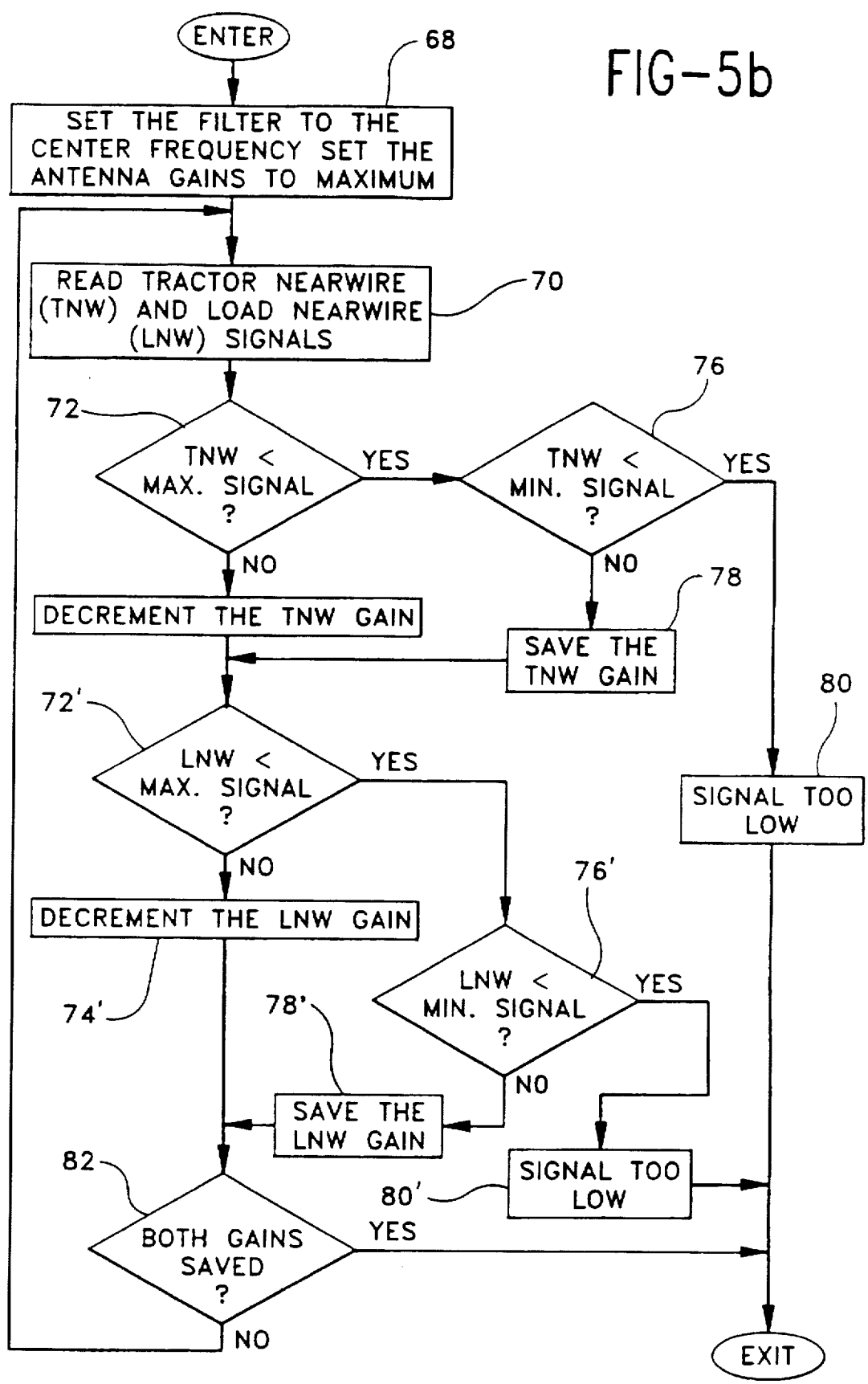

The same process is performed on the LNW signal, as indicated by steps 72'–80' on FIG. 5b.

After both antennae 14a, 14b have had their gains set, the learning process is complete, step 82.

Management of the steering system requires information from the vehicle, such as the position of the auto/manual switch, not shown, vehicular speed, and travel direction. The steer manager 16 has access to this information through its interface to the network communication bus 17. This interface allows all of the vehicular computers (not shown) to work together as a single, seamless unit; it also allows the steering information to be registered directly on the operator's displays (not shown).

The steer manager 16 also has its own interface devices for the vehicle's steering components. An amplifier 28 within the steer manager 16 directly drives the steering motor 15, as shown. The position of the drive unit 18 is determined by monitoring the signals from a feedback device 27 connected to the drive unit 18. The commands to the steering motor 15 are derived using fuzzy logic from the position error (actual position minus requested position) and the rate of change of the position error.

The steer manager 16 determines the appropriate time to switch from manual to automatic steering and vice-versa. If the AUTO/MANUAL switch 9 is in the manual position, the input from the operator's steering tiller 19 is generally used. Exceptions are made only when an error condition prevents manual steering.

The AUTO/MANUAL switch 9 is provided for operating the vehicle in either mode. In the "automatic" position, the signals from the respective wire guidance antennae 14a and 14b are used to steer the vehicle when certain conditions are met. Automatic steering begins only when a guidewire 26 of the appropriate frequency and signal strength is detected. Ability to acquire wire is limited by vehicle physical features such as mass, steer rate, traction, and response time. If the sensor overshoots the guidewire 26 due to excessive speed and/or an acquisition angle outside of a nominal range, the steering immediately reverts to the manual mode. If the guidewire signal disappears while the vehicle is acquiring it, or while it is locked thereonto, the steering again immediately reverts to the manual mode. Steering also reverts to manual mode under any conditions that prevent proper wire guidance operation, such as antenna or guidewire failure.

The steer manager 16 interacts with the vehicle through its interface to the network communications bus 17, as aforementioned. The steer manager 16 reads and writes to the bus 17 in a timely manner to provide sufficient updates of information throughout the vehicle. The steer manager 16 also detects any failure of the communications network and/or the information provided by the bus 17, taking necessary and appropriate actions.

The steer manager 16 provides information about the steering system (such as drive unit position, steering status, error conditions, and maintenance mode information) to the system controller 11.

The steer manager 16 detects any condition of poor steering function performance, due to either long delays in responding to commands and/or limited maximum rotation rates. If the steer manager 16 determines that the vehicle has deviated from the wire by 3° of heading angle or 3" of distance from wire, a message is sent to the system controller 11. The limits of 3° and 3" are, of course, arbitrary, and can be configurable by the system controller to lower values, if desired.

Proper wire guidance includes stopping the vehicle due to excessive distance from wire and/or angular deviation.

Steering does not revert to manual mode under this condition, unless the antenna range is exceeded.

The steer manager 16 also provides a rail guidance feature wherein the drive unit is turned to a straight-ahead direction and actively held there. Both the operator's steering tiller 19 and the wire guidance signals are ignored. This feature is used to reduce stress on the traction system and scuffing of the drive tire, not shown.

Now referring to FIG. 6, a flow chart 100 of the logic program of this invention is illustrated. When the vehicle is first powered-up and the "deadman", not shown, has been activated, the drive unit 18 (FIG. 2) is automatically set to the straight-ahead position. The steer manager 16 broadcasts a message informing other systems of its readiness. The steer manager 16 periodically broadcasts the actual position of the drive unit 18. In the manual mode of operation, the tiller 19 provides a manual position request 101, shown as signal "B".

A decision block 102 of the logic program determines whether the system AUTO/MANUAL switch 9 is in the AUTOMATIC mode. If the system is on automatic control, step 103, the position request is equal to the automated position request, as indicated by the signal shown as "A". The distance from wire is calculated, step 112, and the vehicle heading angle is calculated, step 114, using the formula in FIG. 3. The DFW and $\psi$ (heading angle) are used to calculate the automatic position request "A", step 115, in accordance with the following equations:

For two antennae:

Automated Position Request=$K_1 * DFW \pm K_2 * \psi$ where $K_1$ and $K_2$ are scaling constants.

For one antenna (e.g., tractor antenna), when vehicle is being guided on wire:

Automated Position Request=$K_3 * DTCP$ where $K_3$ is a scaling constant.

For one antenna (e.g., tractor antenna), when the vehicle is acquiring wire:

Automated Position Request=$V_f * DTCP + K_4 * \Delta DFW$ where $$\frac{V_f}{(\text{in mph})} = \frac{9}{3 + |\text{vehicle velocity}|}$$

$K_4$ is a scaling constant $\Delta DFW$ is the difference of relative wire position over time.

If either calculation (step 112 or step 114) is beyond the tolerance required, a signal is provided to the system controller 11 informing it of the aforementioned condition. If the manual mode is active, step 102, the position request is set equal to the manual position request, step 104. Either automated position request signal "A" or manned position request signal "B" is fed to block 105. A position feedback signal 107 is also fed to block 105 from the steer unit 106. Block 105 determines the error between the requested signal and the feedback position. An appropriate signal is generated and the rate of change of the steering position error is calculated, step 108. Both determinations from blocks 105 and 108 are fed to a fuzzy logic routine 109, developed using the fuzzy logic package, as aforementioned. The fuzzy logic routine 109 provides a signal which is used to produce a command for direction and speed, step 110, that is sent to the steer motor 15, as shown.

The rule-based fuzzy logic definitions of input and output variables, along with rules used in the preferred embodiment, are shown below in the FIL language.

$ e is the error of steer_request-motor_position
> e "error": -127 (1) 127|
  NB (@-127, 1, @-75, 1, @-50, 0),
  NM (@-75, 0, @-50, 1, @-25, 0),
  NS (@-50, 0, @-25, 1, @5, 0),
  ZO (@-20, 0, @0, 1, @20, 0),
  PS (@-5, 0, @25, 1, @50, 0),
  PM (@25, 0, @50, 1, @75, 0),
  PB (@50, 0, @75, 1, @127, 1),
  NZ (@-60, 0, @-5, 1, @5, 1, @60, 0)
|; $end of labels $ de is the current position – last position
>de "delta error": -127(1) 127|
  NB (@-127, 1, @-112, 1, @-75, 0),
  NM (@-112, 0, @-75, 1, @-38, 0),
  NS (@-76, 0, @-38, 1, @0, 0),
  ZO (@-38, 0, @0, 1, @38, 0),
  PS (@0, 0, @38, 1, @75, 0),
  PM (@38, 0, @75, 1, @112, 0),
  PB (@75, 0, @112, 1, @127, 1)
|;

$ pwm is the voltage to operate the steer motor
<pwm "PWM": -127(1)127*(
  NB=-127,
  NM=-38,
  NS=-15,
  ZO=2,
  PS=15,
  PM=38,
  PB=127
);

if e is PB then pwm is PB;
if e is NB then pwm is NB;
if e is PM then pwm is PM;
if e is NM then pwm is NM;
if e is PS then pwm is PS;
if e is NS then pwm is NS;
if e is ZO then pwm is ZO;
if e is NZ and de is PB then pwm is NB;
if e is NZ and de is NB then pwm is PB;
if e is NZ and de is PM then pwm is NM;
if e is NZ and de is NM then pwm is PM;
if e is NZ and de is PS then pwm is NS;
if e is NZ and de is NS then pwm is PS.

Referring again to FIG. 2, the steer manager 16 also calculates thy height of the vehicle's mast via a height calculator 23 and a hydraulic flow sensor 21. The weight of the carried load is additionally calculated via a weight calculator 24 and pressure transducers 20 that are carried on the forklift platform, not shown. It is necessary to determine the load's weight and height in order to control the speed by which the vehicle is safely operated.

Prior to this invention, in order to learn the flow pulses between the mast switches on a vehicle, 12 lift / lowers are performed with the last 6 lifts averaged for the up flow pulses and the last 6 lowers averaged for the down flow pulses. As the temperature of the hydraulic fluid increases, the number of flow pulses between the mast switches increase.

Since the up and down flow pulses of the flow sensor increase with the temperature of the hydraulic fluid, up and down calibration units are needed for multiple temperatures. To properly record the up and down calibration units the lift / lower request must continuously be greater than 80% of maximum range and travel must cross both mast reference switches.

To get the calibration units at multiple temperatures, a table is used. The table has the up calibration units, the down calibration units, and a flag that will determine if the calibration units for that temperature have been recorded. The index into the table is the temperature which ranges from 10° C. to 90° C. in 10° increments.

| °C. | Up Calibration Units | Down Calibration Units | Recorded Flag |
| --- | --- | --- | --- |
| 10 | XXXX | XXXX | X |
| 20 | XXXX | XXXX | X |
| 30 | XXXX | XXXX | X |
| 40 | XXXX | XXXX | X |
| 50 | XXXX | XXXX | X |
| 60 | XXXX | XXXX | X |
| 70 | XXXX | XXXX | X |
| 80 | XXXX | XXXX | X |
| 90 | XXXX | XXXX | X |

There are two types of calibration recording processes: one that runs under Learning Mode and the other that runs under Normal Operation Mode.

Under the learning mode, when the request is received to record the calibration units, the recorded flags are reset. The up calibration units and the down calibration units are recorded for the nearest temperature at the time of the request.

For example, when the conditions above are met to properly record the calibration units and the temperature is at 31° C., the up and down calibration units are then recorded for that temperature in the table and the recorded flag for 30° C. is set.

| °C. | Up Calibration Units | Down Calibration Units | Recorded Flag |
| --- | --- | --- | --- |
| 20 | XXXX | XXXX | 0 |
| 30 | 22942 | 23590 | 1 |
| 40 | XXXX | XXXX | 0 |

Under Normal Operation Mode, the height is continuously calculated and is not hampered by this process. The temperature is continuously monitored. The height calibration units need to change as the temperature changes up or down. The calibration units used will be determined by indexing into the calibration table using the temperature as the index. The nearest calibration units for that temperature, with the recorded flag set, are used.

The calibration units are updated only if not previously recorded and the proper conditions above are met. The up and down calibration units will be recorded and stored in the table at that temperature and the recorded flag set.

For example, if the temperature is 40° C., and the calibration units have not been previously recorded, and the proper conditions above are met, then the up and down calibration units for that temperature are stored in the table and the learn flag for 40° C. is set.

| °C. | Up Calibration Units | Down Calibration Units | Recorded Flag |
| --- | --- | --- | --- |
| 20 | XXXX | XXXX | 0 |
| 30 | 22942 | 23590 | 1 |
| 40 | 23000 | 23650 | 1 |
| 50 | XXXX | XXXX | 0 |

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Having thus described the invention, what is desired to be protected by Letters Patent is presented in the subsequently appended claims.

What is claimed is:

1. A method to be used with a material handling vehicle that is operative in an automatic wire guidance mode, the vehicle used with a plurality of automatic wire guidance systems, each system transmitting guidance signals having a frequency and amplitude characteristic of the system, the guidance signals used to guide the vehicle, the vehicle including a steering control means and a signal sensor, the control means including a frequency filter and a gain amplifier, the method for automatically setting the filter frequency and amplifier gain so that the steering control means is responsive to guidance signals from one of said guidance systems, said one of the guidance systems being a system with which the vehicle is to be used, the method comprising the steps of:
   a) sensing the guidance signal corresponding to the one of the guidance systems;
   b) processing the sensed signal to ascertain the characteristic frequency of the guidance signal and determine the amplitude gain required to alter the guidance signals for use by the control means; and
   c) setting the filter frequency and the amplifier gain so that the steering control means is responsive to signals having substantially the characteristic amplitude and frequency of the guidance signals.

2. The method of claim 1 wherein the guidance system includes a guide wire and the step of sensing includes the step of generating feedback signals indicating the position of the vehicle with respect to the guide wire wherein the feedback signals also comprise information indicating the amplitude and frequency of the guidance signal.

3. The method of claim 1 wherein the step of processing includes the step of monitoring the feedback signals at each frequency within a range of possible guidance signal frequencies to identify the guidance signal frequency, the guidance signal frequency being the frequency at which the sensed signal is the strongest.

4. The method of claim 1 wherein the vehicle is also operative in a manual mode and the method further includes the step of, prior to the step of sensing, in the manual mode, moving the vehicle into a position within a receiving range of said one of the guidance systems.

5. An apparatus to be used with a material handling vehicle that is operative in an automatic wire guidance mode, the vehicle used with a plurality of automatic wire guidance systems, each system transmitting guidance signals having a frequency and amplitude characteristic of the system, the guidance signals used to guide the vehicle, the vehicle including a steering control means, the steering control means including a frequency filter and a gain amplifier, the apparatus for automatically setting the filter frequency and the amplifier gain so that the steering control means is responsive to guidance signals from one of said guidance systems, said one of the guidance systems being a system with which the vehicle is to be used, the apparatus comprising:

(a) a sensor for sensing the guidance signal corresponding to the one of the guidance systems;

(b) a processor for processing the sensed signal to ascertain the characteristic frequency of the guidance signals and determine the amplitude gain required to alter the guidance signals for use by the control means; and c) means for setting the filter frequency and the amplifier gain so that the steering control means is responsive to signals having the characteristic amplitude and frequency of the guidance signals.

6. The apparatus of claim 5 wherein said one of the guidance systems includes a guidewire and the sensor generates feedback signals indicating the position of the vehicle with respect to the guidewire wherein the feedback signals also comprise information indicating the amplitude and frequency of the guidance signal.

7. The apparatus of claim 5 wherein the processor includes a monitor for monitoring the sensed signal at each frequency within a range of possible guidance signal frequencies to identify the guidance signal frequency, the guidance signal frequency being the frequency at which the sensed signal is the strongest.

8. The apparatus of claim 7 wherein said steering control means includes a variable gain amplitude amplifier and the means for setting changes the amplifier gain so that an amplified guidance signal has an amplitude within a steering control means range and the means for setting calibrates said steering control means to be responsive to signals at substantially the guidance signal frequency.

9. A method to be used with a material handling vehicle that is operative in an automatic wire guidance mode, the vehicle used with an automatic wire guidance system, the system transmitting a guidance signal used to guide the vehicle, the vehicle including a steering control means and at least first and second signal sensors to sense the guidance signal, the method for minimizing the effects of noise on the position of the vehicle with respect to the guidance wire, the method comprising the steps of:

a) sensing the guidance signal using the first and the second signal sensors to provide first and second sensed signals;

subtracting the first signal from the second signal to generate a differenced output indicative of the position of the guidance wire with respect to the sensors;

c) limiting the maximum rate of change of the differenced output so as to minimize the effects of noise on the position of the vehicle with respect to the guidance wire; and d) using the limited differenced output to adjust the position of the vehicle.

10. The method of claim 9 wherein the vehicle is operative in either the automatic wire guidance mode or a manual mode, the vehicle equipped with a mechanism for locking onto the guidewire, the method further including the steps of, when the vehicle is in the manual mode and switching over to the automatic wire guidance mode, setting the maximum rate of change to a first value while the mechanism is acquiring the guidance wire and setting the maximum rate of change to a second value after the mechanism has acquired the wires, wherein the first value is higher than the second value.

* * * * *